US010311438B2

(12) United States Patent
Lewis et al.

(10) Patent No.: US 10,311,438 B2
(45) Date of Patent: *Jun. 4, 2019

(54) METHOD AND APPARATUS FOR AUTOMATED SHOPPER CHECKOUT USING RADIO FREQUENCY IDENTIFICATION TECHNOLOGY

(71) Applicant: Walmart Apollo, LLC, Bentonville, AR (US)

(72) Inventors: Justin C. Lewis, Scotch Plains, NJ (US); Richard B. Ulrich, Bentonville, AR (US); Nicholaus A. Jones, Fayetteville, AR (US); Matthew M. Lowrie, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 592 days.

This patent is subject to a terminal disclaimer.

(21) Appl. No.: 14/301,225

(22) Filed: Jun. 10, 2014

(65) Prior Publication Data

US 2014/0344087 A1 Nov. 20, 2014

Related U.S. Application Data

(63) Continuation of application No. 12/267,068, filed on Nov. 7, 2008, now Pat. No. 8,781,908.

(Continued)

(51) Int. Cl.
*G06Q 20/40* (2012.01)
*G06Q 20/20* (2012.01)
(Continued)

(52) U.S. Cl.
CPC ..... *G06Q 20/4016* (2013.01); *G06K 7/10366* (2013.01); *G06Q 20/202* (2013.01);
(Continued)

(58) Field of Classification Search
CPC ............ G06Q 20/4016; G06Q 20/202; G06Q 20/203; G06Q 20/208; G06Q 20/3278;
(Continued)

(56) References Cited

U.S. PATENT DOCUMENTS 5,965,861 A 10/1999 Addy
6,047,262 A * 4/2000 Lutz .................. A47F 9/047
705/16

(Continued)

FOREIGN PATENT DOCUMENTS

| EP | 1736945 | 12/2006 |
|---|---|---|
| GB | 2307575 | 5/1997 |
| WO | 2009062019 | 5/2009 |

OTHER PUBLICATIONS

Wyld, David C., and Michael C. Budden. "Upping the ante: Using RFID as a competitive weapon to fight shoplifting and improve business intelligence." The International Journal of Managing Information Technology 1.1 (2009): 1-10.*

(Continued)

*Primary Examiner* — Asfand M Sheikh
(74) *Attorney, Agent, or Firm* — Fitch, Even, Tabin & Flannery LLP

(57) ABSTRACT

A method and apparatus involve: providing a plurality of products that are each associated with a respective radio frequency identification tag; using radio frequency identification technology to automatically identify specific products in a group of products collected by a shopper; and evaluating whether or not to obtain payment from the shopper based on the radio frequency identification of products in the group. Based on the result of the evaluation, either payment is obtained from the shopper on the basis of the radio frequency identification of products in the group, or else the (Continued)

products in the group are audited, and then payment is obtained on the basis of the products identified by the audit.

28 Claims, 9 Drawing Sheets

Related U.S. Application Data

(60) Provisional application No. 60/996,262, filed on Nov. 8, 2007.

(51) Int. Cl.
*G06Q 20/32* (2012.01)
*G06Q 30/02* (2012.01)
*G07G 1/00* (2006.01)
*G07G 1/14* (2006.01)
*G06K 7/10* (2006.01)

(52) U.S. Cl.
CPC ......... *G06Q 20/203* (2013.01); *G06Q 20/208* (2013.01); *G06Q 20/3278* (2013.01); *G06Q 30/02* (2013.01); *G07G 1/009* (2013.01); *G07G 1/0045* (2013.01); *G07G 1/0054* (2013.01); *G07G 1/0072* (2013.01); *G07G 1/14* (2013.01)

(58) Field of Classification Search
CPC .... G06Q 30/02; G07G 1/0054; G07G 1/0072; G07G 1/009; G07G 1/0045; G07G 1/14; G06K 7/10366
See application file for complete search history.

(56) References Cited

U.S. PATENT DOCUMENTS

| | | | |
|---|---|---|---|
| 6,056,087 A | 5/2000 | Addy | |
| 6,105,867 A | 8/2000 | Shimizu | |
| 6,386,448 B1 | 5/2002 | Addy | |
| 6,497,361 B1 | 12/2002 | Mason | |
| 7,005,988 B2 | 2/2006 | Mathewson, II | |
| 7,012,528 B2 | 3/2006 | Mathewson, II | |
| 7,044,370 B2 | 5/2006 | Bellis, Jr. | |
| 7,150,395 B1* | 12/2006 | White | G06Q 30/06 235/383 |
| 7,240,824 B2 | 7/2007 | Stockton | |
| 7,275,690 B1 | 10/2007 | White | |
| 7,337,962 B2 | 3/2008 | Do | |
| 7,387,241 B2 | 6/2008 | Hassenbuerger | |
| 7,416,119 B1 | 8/2008 | Inderrieden | |
| 7,673,797 B2* | 3/2010 | Edwards | G06Q 20/206 235/380 |
| 7,744,130 B2 | 6/2010 | Zazzu | |
| 7,997,486 B2 | 8/2011 | Ulrich | |
| 8,239,677 B2 | 8/2012 | Colson | |
| 8,267,316 B2 | 9/2012 | Ostrowski | |
| 8,275,664 B2 | 9/2012 | Ramsdale | |
| 8,360,207 B1 | 1/2013 | Goodwin, III | |
| 8,447,664 B1* | 5/2013 | Pape | G06Q 10/087 705/28 |
| 8,669,915 B2 | 3/2014 | Wilkinson | |
| 8,781,908 B2 | 7/2014 | Lewis | |
| 8,825,531 B1* | 9/2014 | Catoe | G07G 1/0036 235/383 |
| 2003/0102373 A1 | 6/2003 | Swartz | |
| 2003/0216969 A1* | 11/2003 | Bauer | G06K 7/0008 705/22 |
| 2004/0118916 A1 | 6/2004 | He | |
| 2005/0173527 A1 | 8/2005 | Conzola | |
| 2006/0015532 A1 | 1/2006 | Mizell | |
| 2006/0107307 A1 | 5/2006 | Knox | |
| 2007/0034692 A1 | 2/2007 | Johnson | |
| 2007/0102513 A1 | 5/2007 | Scheb | |
| 2007/0158417 A1* | 7/2007 | Brewington | G06Q 30/06 235/383 |
| 2008/0218313 A1 | 9/2008 | dHont | |
| 2009/0125406 A1 | 5/2009 | Lewis | |
| 2009/0219159 A1 | 9/2009 | Morgenstern | |
| 2010/0140351 A1 | 6/2010 | Trenciansky | |
| 2012/0086553 A1 | 4/2012 | Wilkinson | |
| 2013/0015242 A1 | 1/2013 | White | |
| 2013/0018715 A1 | 1/2013 | Zhou | |
| 2013/0311230 A1 | 11/2013 | Kellstrand | |
| 2013/0328682 A1 | 12/2013 | Shearin | |

OTHER PUBLICATIONS

PCT; App. No. PCT/US2008/082772; International Preliminary Report on Patentability dated May 11, 2010.
PCT; App. No. PCT/US2008/082772; International Search Report dated Feb. 25, 2009.
PCT; App. No. PCT/US2008/082772; Written Opinion dated Feb. 25, 2009.
U.S. Appl. No. 12/267,068; Notice of Allowance dated Mar. 10, 2014.
U.S. Appl. No. 12/267,068; Office Action dated Jan. 31, 2012.
U.S. Appl. No. 12/267,068; Office Action dated Mar. 29, 2011.
U.S. Appl. No. 12/267,068; Office Action dated Jul. 2, 2013.
EPCglobal; 'EPC(TM) Radio-Frequency Identity Protocols Class-1 Generation-2 UHF RFID Protocol for Communications at 860 MHz-960 MHz Version 1.0.9;' Specification for RFID Air Interface by EPCglobal Inc.; 94 pages, Jan. 2005.

\* cited by examiner

FIG. 4

| PRODUCT NAME | UPC CODE | PRICE | ... | WEIGHT | DIFFICULTY |
|---|---|---|---|---|---|
| 191 | 192 | 193 | | 194 | 195 |

| BUSINESS VALUE | DIFFICULTY THRESHOLD | TAG COUNT THRESHOLD | WEIGHT THRESHOLD (POUNDS) | WINDOW WIDTH (COLUMNS) | DIFFERENTIAL THRESHOLD |
|---|---|---|---|---|---|
| 1 | 1 | 50 | 200 | 10 | 50 |
| 2 | 2 | 45 | 180 | 9 | 45 |
| 3 | 3 | 40 | 160 | 8 | 40 |
| 4 | 4 | 35 | 140 | 7 | 35 |
| 5 | 5 | 30 | 120 | 6 | 30 |
| 6 | 6 | 25 | 100 | 5 | 25 |
| 7 | 7 | 20 | 80 | 4 | 20 |
| 8 | 8 | 15 | 60 | 3 | 15 |
| 9 | 9 | 10 | 40 | 2 | 10 |
| 10 | 10 | 5 | 20 | 1 | 5 |

216 / 217 / 218 / 219 / 220 / 221

| TAG COUNT | WEIGHT | WEIGHT DIFFERENTIAL | CONFIDENCE |
|---|---|---|---|
| 1 | 1-2 | 0 | 100% |
| -- | 3-4 | -- | 99% |
| 2 | 5-6 | 1 | 98% |
| -- | 7-8 | -- | 97% |
| 3 | 9-10 | 2 | 96% |
| -- | 11-12 | -- | 95% |
| 4 | 13-14 | 3 | 94% |
| -- | 15-16 | -- | 93% |
| 5 | 17-18 | 4 | 92% |
| ⋮ | ⋮ | ⋮ | ⋮ |
| 48 | 189-190 | 47 | 6% |
| -- | 191-192 | -- | 5% |
| 49 | 193-194 | 48 | 4% |
| -- | 195-196 | -- | 3% |
| 50 | 197-198 | 49 | 2% |
| -- | 199-200 | -- | 1% |
| 51+ | 201+ | 50+ | 0% |

*FIG. 9*

| COLUMNS SPANNED | CONFIDENCE |
|---|---|
| 1 | 100% |
| 2 | 90% |
| 3 | 80% |
| 4 | 70% |
| 5 | 60% |
| 6 | 50% |
| 7 | 40% |
| 8 | 30% |
| 9 | 20% |
| 10 | 10% |

*FIG. 10*

METHOD AND APPARATUS FOR AUTOMATED SHOPPER CHECKOUT USING RADIO FREQUENCY IDENTIFICATION TECHNOLOGY

This application is a continuation of U.S. application Ser. No. 12/267,068 filed Nov. 7, 2008, which claims the priority under 35 U.S.C. § 119 of provisional application No. 60/996,262 filed Nov. 8, 2007, the disclosure of both of which are hereby incorporated herein by reference.

FIELD OF THE INVENTION

This invention relates in general to techniques for shopper checkout and, more particularly, to techniques that facilitate efficient checkout of a shopper.

BACKGROUND

Shopper checkout is the process of identifying all of the products selected by a shopper, and then obtaining payment from the shopper for those products. Retail stores typically use two different techniques for shopper checkout. First, in the most common approach, a clerk employed by the store manually passes each product selected by the shopper past a universal product code (UPC) scanner, and the scanner reads the UPC code on each product. The UPC scanner is coupled to a computer, and the computer uses the scanned UPC code from each product to retrieve from a stored product list an identification of the product, and also the price of the product. The computer sums the individual prices of all products scanned in order to obtain a subtotal, and then adds any applicable taxes or other charges to the subtotal, thereby obtaining the total amount owed by the shopper. The clerk then obtains payment of that total amount from the shopper in order to complete the checkout process.

The other common approach is self-service checkout. During self-service checkout, it is the shopper rather than a store clerk who manually scans the UPC code on each product. A single clerk is typically present to monitor four or more self-service checkout stations, and to deal with any questions or problems encountered by shoppers operating the self-service checkout stations. The self-service approach is significantly less expensive for the store, because the store pays wages and benefits only for the single clerk who monitors several self-service checkout stations, instead of paying wages and benefits for several clerks who are each located at a respective different checkout station. On the other hand, the self-service approach has some drawbacks. For example, a shopper may inadvertently or intentionally fail to scan the UPC code on one or more products, such that the computer calculating the total amount due is not aware of those products and thus omits their prices from the total. As a result, the shopper ends up taking home one or more products that the shopper did not pay for.

While these traditional approaches have each been generally adequate for their intended purposes, they each have some drawbacks, and neither has been entirely satisfactory in all respects.

BRIEF DESCRIPTION OF THE DRAWINGS

A better understanding of the present invention will be realized from the detailed description that follows, taken in conjunction with the accompanying drawings, in which:

FIG. 4 is a diagrammatic view of a master product list that is stored in a memory of the computer system of FIG. 3.

FIGS. 6 and 7 show respective tables of information that are each stored in the memory of the computer system of FIG. 3, and that are used by the procedure of FIGS. 5A and 5B.

FIGS. 9 and 10 show respective tables of information that can be substituted for the table of FIG. 6, and used by the procedure of FIG. 8.

DETAILED DESCRIPTION

Figure 1:
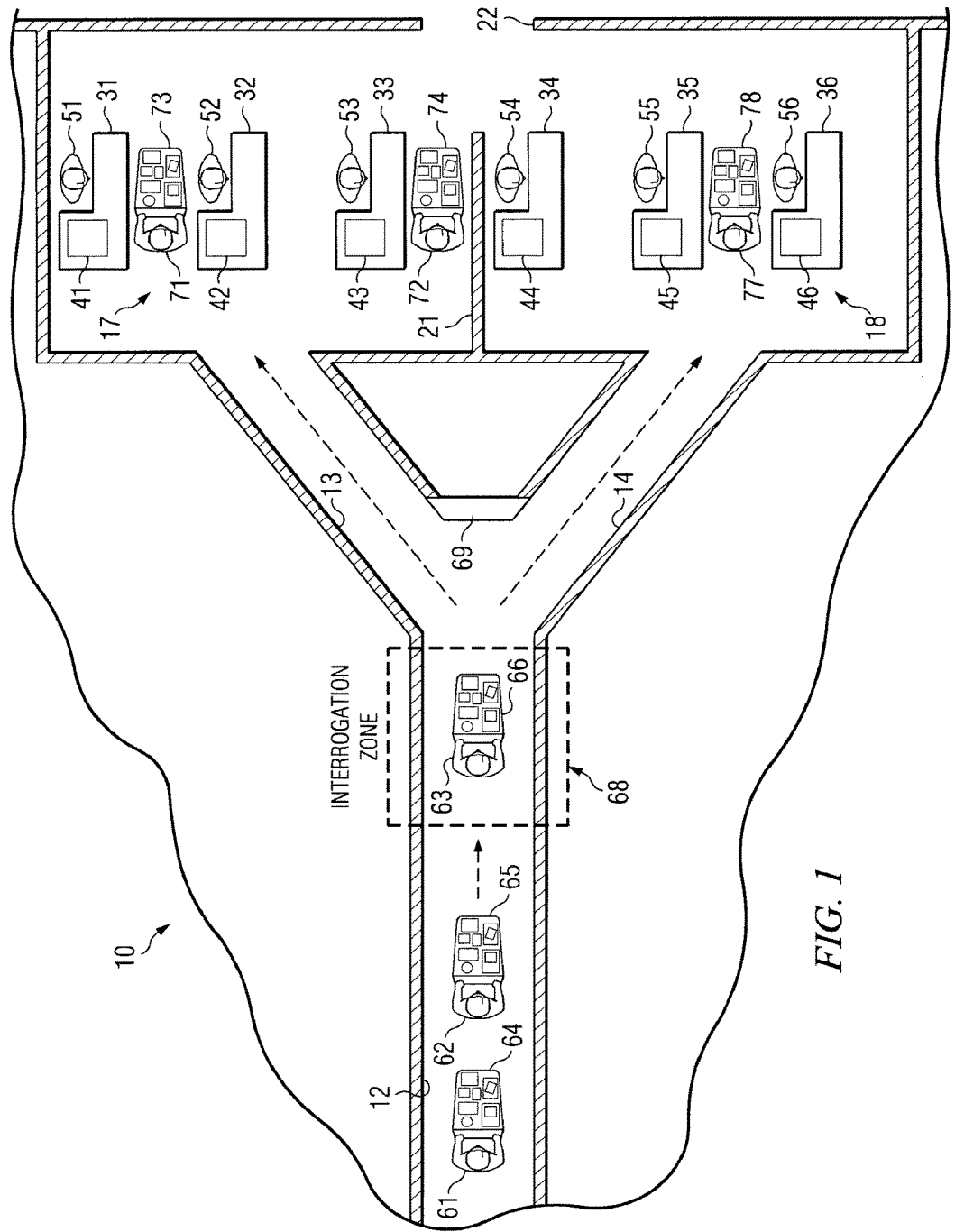
FIG. 1 is a diagrammatic fragmentary sectional top view of a portion of a retail store, and in particular shows a portion of the store where shoppers check out and pay for their purchases.

FIG. 1 is a diagrammatic fragmentary sectional top view of a portion 10 of a retail store, and in particular shows the portion of the store where shopper checkout occurs. Shopper checkout is the process of identifying all of the products selected by a shopper, and then obtaining payment from the shopper for those products.

The portion 10 of the store includes a corridor or passage 12 that splits into two corridors or passages 13 and 14, each of which leads to a respective one of two checkout areas 17 and 18 that are partially separated by a wall 21. The corridors 13 and 14 each open into the associated checkout area 17 or 18 on one side thereof, and a single exit door 22 is provided on the opposite side thereof to permit shoppers to exit the store after completing the checkout process.

The checkout area 17 has three checkout stations 31, 32 and 33, and the checkout area 18 has three checkout stations 34, 35 and 36. Each of the checkout stations 31-36 includes a respective point-of-sale (POS) terminal 41-46 that is an electronic cash register of a known type. In FIG. 1, the checkout stations 31-36 are each manned by a respective person 51-56 who is a store clerk. In an alternative configuration, the three POS terminals 41-43 in the checkout area 17 could be replaced with self-service POS terminals of a type well known in the art. In the case of self-service POS terminals, a single store clerk might be stationed nearby to monitor all three checkout stations 41-43, or the store might elect to provide no store clerk in the checkout area 17.

Shoppers who are waiting to check out proceed in single file down the corridor 12. For example, FIG. 1 shows three shoppers 61-63 in the corridor 12, each with a respective shopping cart 64, 65 or 66. An interrogation zone 68 is provided at the end of corridor 12 nearest the corridors 13 and 14. The interrogation zone is discussed in more detail later. In FIG. 1 the shopper 63 with the cart 66 is currently located in the interrogation zone 68.

In FIG. 1, an electronic display 69 is provided at the intersection of the corridors 13 and 14. Depending on what happens in the interrogation zone 68, the display 69 will illuminate either an arrow pointing to the left or an arrow pointing to the right, in order to indicate to the shopper in the interrogation zone that he or she should proceed down either the corridor 13 or the corridor 14. FIG. 1 shows two shoppers 71 and 72 with respective carts 73 and 74 who were directed to proceed down the corridor 13 to the checkout area 17, and who are currently in the process of checking out. FIG. 1 also shows a shopper 77 with a cart 78 who was directed to proceed down the corridor 14 to the checkout area 18, and who is currently in the process of checking out.

Figure 2:
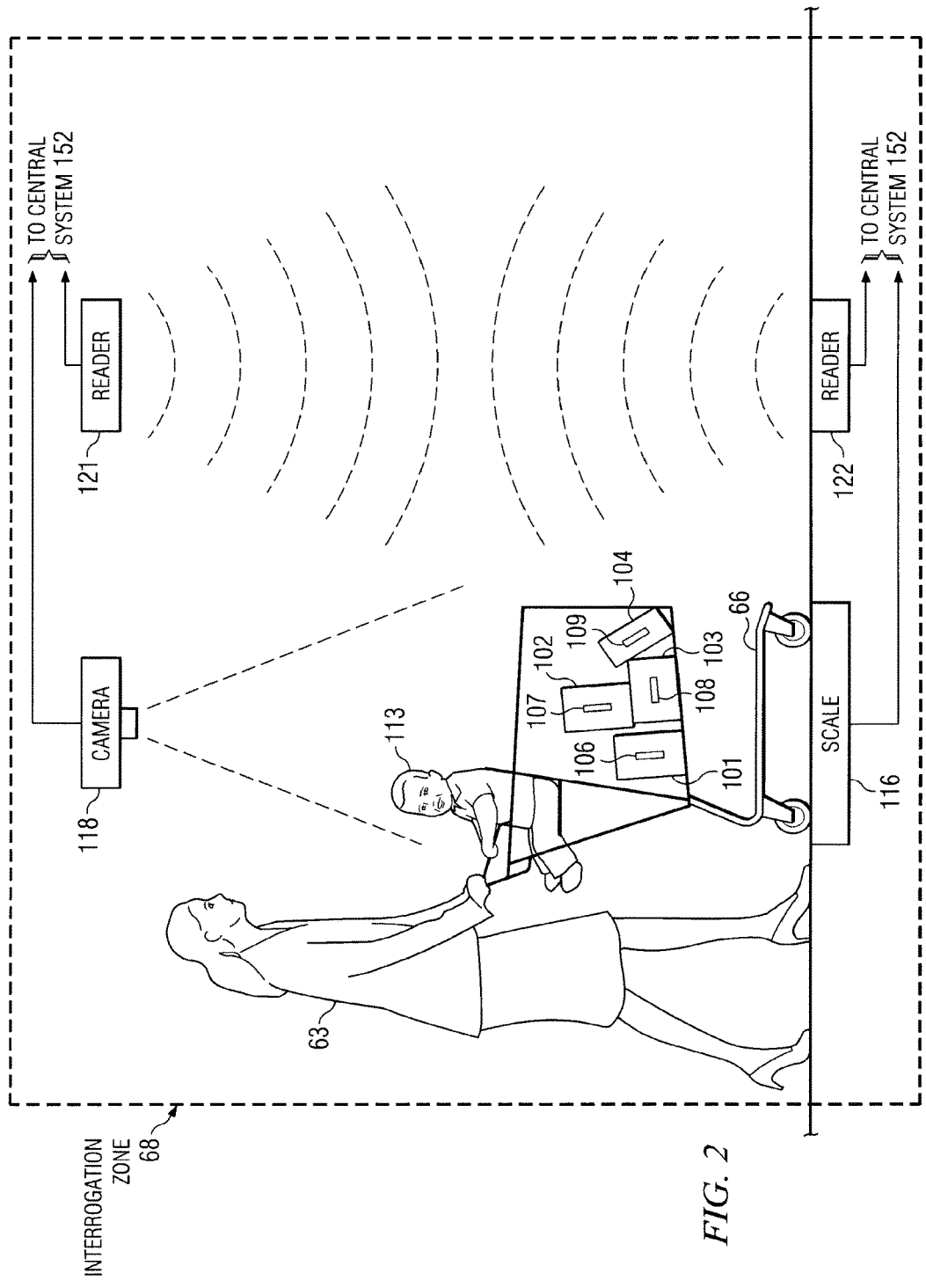
FIG. 2 is a diagrammatic fragmentary side view showing in an enlarged scale an interrogation zone present in the portion of the store depicted in FIG. 1, and also showing a shopper and a shopping cart that are in the interrogation zone.

FIG. 2 is a diagrammatic fragmentary side view showing in an enlarged scale the interrogation zone 68 of FIG. 1, and also showing the shopper 63 and shopping cart 66 in the interrogation zone. The shopping cart 66 contains several products 101-104 that the shopper 63 selected and intends to purchase. Although FIG. 2 shows four products 101-104, the cart 66 could alternatively include a larger or smaller number of products. Each of the products 101-104 has a respective radio frequency identification (RFID) tag 106-109 mounted thereon. The tags 106-109 are each a type of device well known in the art, and are therefore not illustrated and described here in detail. A child 113 is sitting in the shopping cart. The shopper 63 may also have one or more personal effects in the cart, such as a purse.

In FIG. 2, the shopping cart 66 is resting on a scale 116 of a known type, which weighs the cart 66 and everything in the cart, and then outputs an electrical signal representing the total measured weight. A digital camera 118 of a known type is stationarily supported above the scale 116. Although FIG. 2 shows only one camera 118, it would alternatively be possible to have two or more cameras that view the cart and its contents from different angles. The camera 118 records one or more images of the cart and its contents as the cart passes below the camera. The camera 118 then outputs these images in the form of electrical signals. The images from the camera 118 are then processed with image processing software in an effort to identify items present in the shopping cart 66, including the number of products 101-104, any child 113, and any personal effects such as a purse. The camera 118 in FIG. 2 is responsive to visual light, and the recorded images are digital photographs. Alternatively, however, the camera 118 could be responsive to radiation in a waveband other than visible light, such as infrared radiation, or low-level x-ray radiation.

As the shopper 63 continues to push the cart 66 in a forward direction, the cart 66 will pass between two RFID readers 121 and 122. The readers 121 and 122 are each a device of a well-known type, and are therefore not illustrated and described here in detail. The reader 121 is stationarily supported above the cart's path of travel, and the reader 122 is embedded in the floor below the cart's path of travel. Although FIG. 2 shows two readers 121 and 122, it would alternatively be possible to have a larger or smaller number of readers. Also, FIG. 2 shows the readers 121 and 122 located respectively above and below the path of travel of the cart, but it would alternatively be possible to provide the readers 121 and 122 in other locations. For example, the readers 121 and 122 could be provided on opposite sides of the path of travel of the shopping cart 66.

The readers 121 and 122 in FIG. 2 emit RFID signals of a known type. As the shopping cart 66 passes between the readers 121 and 122, the signals emitted by the readers will reach most or all of the tags 106-109. Each tag that receives a signal from either reader will produce in reply an RFID signal containing an identification code. The signal emitted by each tag will then be received by one or both of the readers 121 and 122. The identification code in each received signal can be used to identify the tag that emitted the signal, and thus identify the particular product associated with that tag.

In theory, all of the tags will receive the interrogation signals from the readers, such that all of the tags will produce a signal in reply, and all of the signals from the tags will be received by the readers. But as a practical matter, some types of products make it more difficult to scan tags than other types of products. For example, if a product includes a significant amount of metal, the metal can provide a degree of electromagnetic shielding that interferes with attempts to communicate with the tag on that metal product, and/or with tags on other products located near the metal product. Similarly, if a product contains a significant amount of water, that may make it more difficult to communicate with the tag on that product, and/or with tags on other nearby products. As a result, the readers 121 and 122 may not always be able to accurately identify each and every product present in the shopping cart 66. A further consideration is that the readers 121 and 122 cannot identify items in the shopping cart that do not have RFID tags, such as the child 113, or personal effects of the shopper, such as a purse.

Figure 3:
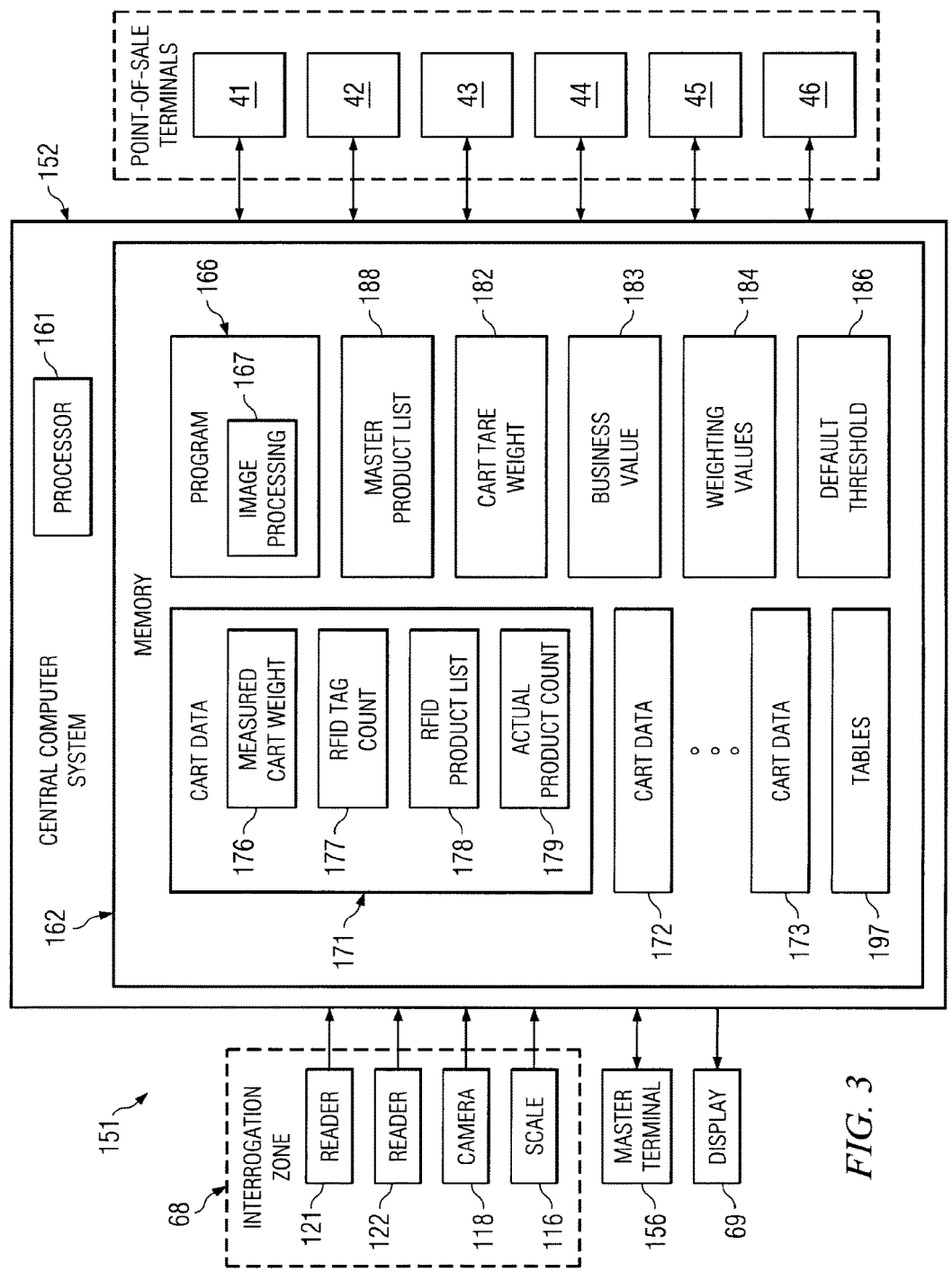
FIG. 3 is a block diagram of a control system that includes several electronic components shown in FIGS. 1 and 2, as well as a central computer system that is operatively coupled to each of these electronic components.

FIG. 3 is a block diagram of a control system 151 that includes several electronic components discussed above in association with FIGS. 1 and 2, as well as a central computer system 152 that is operatively coupled to each of these electronic components. More specifically, FIG. 3 shows the POS terminals 41-46 and the display 69 of FIG. 1, each of which is electrically coupled to the central computer system 152. In addition, FIG. 3 shows the scale 116, camera 118 and readers 121-122 of FIG. 2, each of which is electrically coupled to the central computer system 152. FIG. 3 does not show everything in the control system 151 or in the computer system 152, but instead only shows selected portions thereof that facilitate an understanding of the present invention.

FIG. 3 shows a master terminal 156 that is electrically coupled to the central computer system 152. The master terminal 156 and the central computer system 152 are not visible in FIGS. 1 and 2, because they are located in the business office of the illustrated store, where they can be accessed by store management but not shoppers. Store management can provide the master terminal 156 with a password, and then use the master terminal to adjust data within the central computer system 152. In the disclosed embodiment, the central computer system 152 includes computer hardware in the form of a conventional, commercially-available computer of the type commonly known as a personal computer. For example, the hardware of the computer system 152 could be a standard personal computer obtained commercially from Dell, Inc. of Round Rock, Tex. Alternatively, however, the hardware of the computer system 152 could be any other suitable computer hardware.

The computer system 152 includes a processor 161 and a memory 162. The processor 161 is a microprocessor of a known type, and is therefore not described here in detail. The memory 162 is a diagrammatic representation of the storage available within the central computer system 152, and may include more one than one type of memory. For example, the memory 162 may include one or more of a read only memory (ROM), a random access memory (RAM), a flash memory, a hard disc drive, or any other suitable type of memory.

FIG. 3 diagrammatically shows some of the information that is maintained within the memory 162. More specifically, the memory 162 stores a software program 166 that is executed by the processor 161. A portion of the program 166 is image processing software 167. As mentioned earlier, the image processing software 167 accepts digital images produced by the camera 118, and analyzes these images in an effort to identify the cart and items disposed in the cart, such as the products 101-104 (FIG. 2), any child 113, and/or any personal effects such as a purse.

The memory 162 also stores several segments of cart data, three of which are shown at 171, 172 and 173. Each segment of cart data 171-173 is created as a respective shopping cart passes through the interrogation zone 68, contains information derived from that cart in the interrogation zone 68, and is maintained in the memory 162 until checkout of that particular cart has been completed. The segments of cart data 171, 172 and 173 are all similar, and therefore only the segment 171 is shown and described in detail.

More specifically, the segment of cart data 171 includes a measured cart weight 176, which is the total weight of the particular cart and its contents, as measured by the scale 116 in the interrogation zone. The cart data segment 171 also includes an RFID tag count 177, which is the number of RFID tags detected in that cart by the readers 121 and 122. The cart data 171 further includes an RFID product list 178. As discussed above, the RFID tag on each product produces a wireless signal containing a code that is used to identify the particular product on which that tag is mounted. The RFID product list 178 is a list of all products identified in the cart through communication with RFID tags on the products. The cart data segment 171 also includes an actual product count 179, which is the number of separate products detected by the image processing software 167, based on the images produced by the camera 118.

The memory 162 stores a cart tare weight value 182, which is the predetermined weight of the shopping cart 66 when it is empty.

As discussed above, some products make it more difficult to read RFID tags than other products. Consequently, it is possible for the RFID readers 121 and 122 to miss one or more products in a cart. Similarly, the camera 118 produces images that are analyzed in an effort to identify each of the products in the cart. However, the image processing software 167 may not be able to accurately identify each and every product in the cart. For example, a small product may be located beneath some larger products in the cart, and thus may not be visible in any of the images from the camera 118. Consequently, for any given shopping cart, product lists generated from information obtained in the interrogation zone 68 using RFID technology or imaging technology may or may not include all of the products actually present in the cart.

The store may elect to permit a shopper to check out based solely on a product list generated from information obtained in the interrogation zone 68. However, if that list is incomplete, the shopper would take home one or more products that the shopper did not pay for. This is commonly referred to as shrinkage of the store's inventory.

On any given day (or during certain periods of the day), a store may not be very busy, and this or other circumstances may make the store unwilling to accept much shrinkage. Accordingly, instead of checking out all carts based on product list(s) generated from information obtained in the interrogation zone 68, the store may prefer to select a subset of the carts that are checking out, and perform a double-check or audit of the products actually present in each of those carts, in order to generate a very accurate product list for each such cart that is then used for checkout. On the other hand, on any given day (or during certain periods of the day), the store may be very busy and may have a long line of shoppers waiting to check out, and this or other circumstances may make the store more willing to accept a higher risk of shrinkage, in order to keep shoppers happy by checking them out more rapidly. Accordingly, the store may subject fewer carts (or no carts) to a double-check or audit.

In FIG. 3, the memory 162 of the computer system 152 stores a business value 183. The business value 183 can be set by store management using the master terminal 156, and specifies the store's current willingness to tolerate shrinkage. More specifically, the business value 183 is an integer number between 1 and 10, inclusive. The values of 1 to 10 represent a sliding scale of tolerance for shrinkage, where 1 represents the maximum tolerance for shrinkage with the smallest percentage of carts being double-checked or audited, and 10 represents the least tolerance for shrinkage with a substantially higher percentage of carts being double-checked or audited.

The business value 183 influences the determination of whether each shopper in the corridor 12 (FIG. 1) will be directed to proceed down the corridor 13 or down the corridor 14, in a manner discussed in more detail later. Carts that are directed down the corridor 13 end up in the checkout area 17, where checkout is completed using the RFID product list 177 generated from information obtained using RFID technology in the interrogation zone 68. In contrast, carts that are directed to proceed down the corridor 14 end up in the checkout area 18, where a double-check or audit is carried out on each such cart, and then checkout is completed based on the results of the double-check or audit. For example, in the checkout area 18, one of the clerks 54-56 may use a standard UPC scanner to manually scan the universal product code (UPC) on each product in a cart, in order to generate a highly accurate product list that is then used for checkout.

The memory 162 stores a set of weighting values 184. In the disclosed embodiment, there are six weighting values W1, W2, W3, W4, W5 and W6, each of which is an integer value between 1 and 5 inclusive, where 5 represents the greatest weight, and 1 represents the least weight. The weighting values 184 can each be adjusted by store management through the master terminal 156. The memory 162 also stores a default threshold 186. In the disclosed embodiment, the default threshold is a single integer between 0 and 100 inclusive, and represents a percentage, such as 65%. The default threshold 186 can be adjusted by store management through the master terminal 156.

The memory 162 also stores a master product list 188. FIG. 4 is a diagrammatic view of the master product list 188. The master product list 188 is shown in FIG. 4 as a table, with a separate row for each type of product carried by the store. Each row has the same set of fields, and some of these fields are depicted in the first row in FIG. 4. In particular, for each product or row, there is a field 191 setting forth the name of the product, a field 192 setting forth the industry-standard UPC code for that product, a field 193 setting forth the price charged by the store for that product, a field 194 setting forth the weight of the product, and a field 195 setting forth a difficulty rating.

Each difficulty rating 195 is an integer number between 1 and 10, inclusive. As discussed above, some types of products (such as those that contain metal or water) are more likely to interfere with the scanning of RFID tags than other types of products. The numerical difficulty rating in the field 195 is an indication of the extent to which the associated product is likely to interfere with scanning of the RFID tag mounted on that product, or RFID tags on other nearby products. A value of 1 represents the least degree of interference or difficulty, and a value of 10 represents the greatest degree of interference or difficulty. Store management can use the master terminal 156 to change the information in the master product list 188, including the difficulty ratings 195. For simplicity, FIG. 4 shows the difficulty ratings 195 as an integral portion of the master product list 188. However, the difficulty ratings 195 could alternatively be maintained in a separate list.

Referring again to FIG. 3, the memory 162 in the central computer system 152 also stores several tables 197, each of which is discussed in more detail later.

Figure 5A:
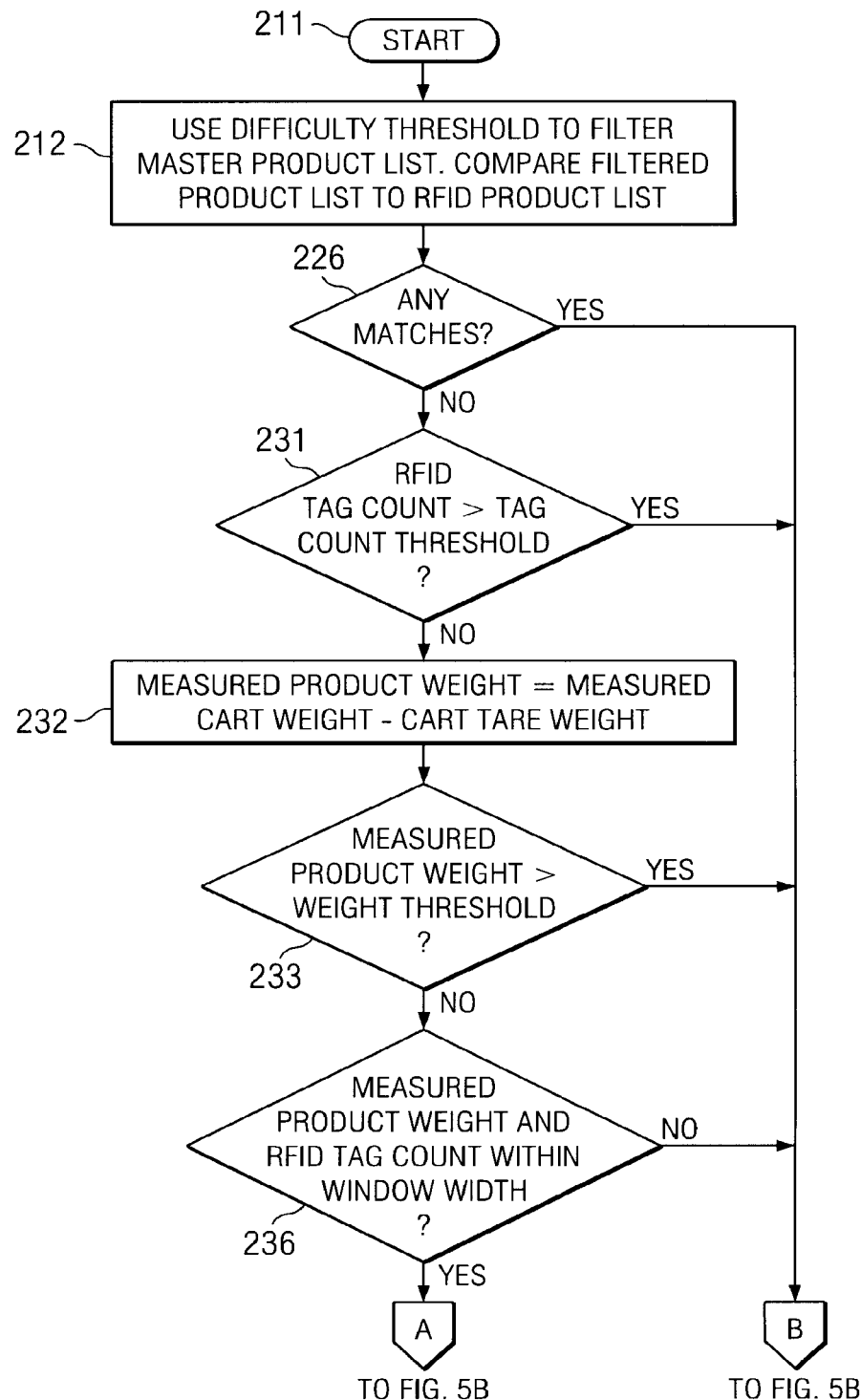
FIGS. 5A and 5B are a flowchart showing a procedure that is part of the processing carried out by the computer system of FIG. 3.
Figure 5B:
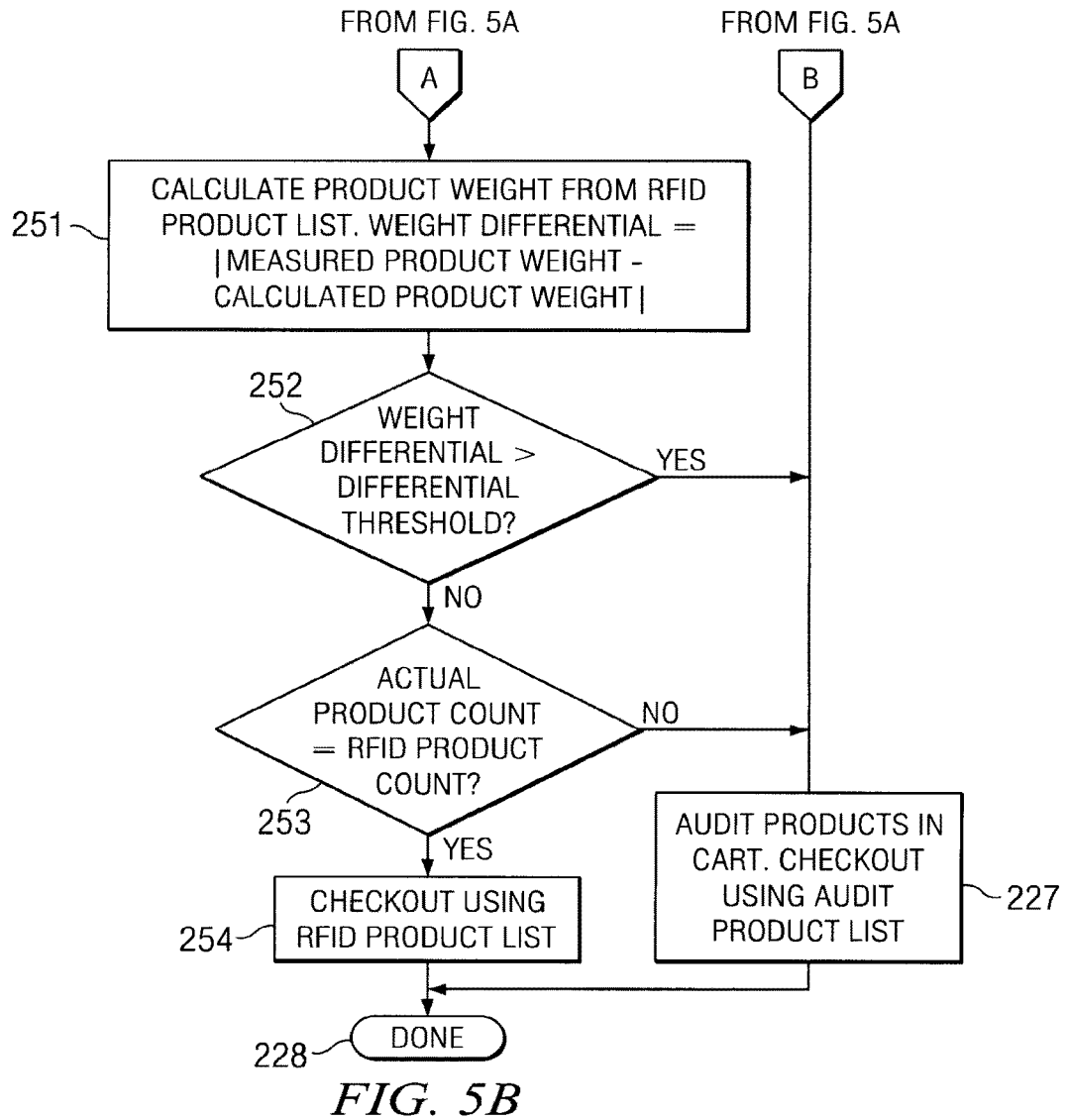

FIGS. 5A and 5B are a flowchart showing a procedure that is a portion of the processing carried out by the processor 161 under control of the program 166. The flowchart of FIGS. 5A and 5B shows how the processor 161 decides whether to direct a shopper along either the corridor 13 or the corridor 14. More specifically, as soon as a given shopping cart has been interrogated in the interrogation zone 68 (FIGS. 1 and 2), the processor 161 carries out an evaluation that is based primarily on data collected during the interrogation. Then, the processor makes a decision about whether to direct the cart along the corridor 13 to the checkout area 17, or along the corridor 14 to the checkout area 18. As discussed above, in the checkout area 17 shoppers check out and pay based on the product list compiled using RFID technology. In contrast, in the checkout area 18, the products in each cart are audited (for example by scanning UPC codes), in order to generate a new and accurate product list that is then used for checkout.

As discussed in more detail below, the procedure of FIGS. 5A and 5B involves successive evaluation of six different criteria. Each criteria looks for a respective different condition that suggests a likelihood the RFID product list 178 might not be fully accurate. If the cart fails to meet any one of these six criteria, then the contents of the cart are audited in the checkout area 18. On the other hand, if the cart meets all six criteria, then the cart is sent to checkout area 17, and is not audited.

In more detail, the routine of FIGS. 5A and 5B is entered at block 211, and then control proceeds to block 212. In block 212, the processor 161 prepares a filtered product list. In this regard, FIG. 6 shows a table that is one of the tables stored at 197 (FIG. 3) in the memory 162, and that has six columns 216-221. The left column 216 sets forth each possible value of the business value stored at 183 in the memory 162 (FIG. 3), and the adjacent column 217 shows a corresponding difficulty threshold. In the disclosed embodiment, the difficulty threshold happens to be the same as the business value. For example, if the business value is currently 1 then the difficulty threshold is 1, and if the business value is 5 then the difficulty threshold is 5. The processor uses columns 216 and 217 to identify the difficulty threshold associated with the current value of the business value 183.

The processor then identifies each product from the master product list 188 that currently has a difficulty rating (195 in FIG. 4) exceeding the current difficulty threshold obtained from column 217. These products collectively constitute the filtered product list. The processor then compares this filtered product list to the RFID product list 178 (FIG. 3) for the shopping cart that has just been interrogated. Basically, the processor is looking for products (if any) that are on both lists. Any product present on both lists will have a difficulty rating that suggests the product might have blocked access to one or more RFID tags, such that one or more products actually present within the cart may not appear on the RFID product list. In FIG. 5A, control proceeds to block 226, where the processor checks to see whether the comparison yielded any matches, or in other words whether any product was on both lists. If any product is on both lists, then the RFID product list may not be accurate, and control proceeds to block 227.

In block 227, the processor causes the display 69 in FIG. 1 to illuminate an arrow pointing to the right, indicating to the shopper in the interrogation zone 68 that he or she should proceed down the corridor 14 to the checkout area 18. In the checkout area 18, the products in the cart will be carefully audited (for example by having a store clerk manually scan the UPC code on each product). Checkout will then be completed using the product list from the audit. From block 227, the processor proceeds to block 228, and exits the routine of FIG. 5B.

Referring back to block 226, if it was determined that that there was no match, or in other words that no product on the RFID product list was also on the filtered product list, then control proceeds to block 231. In block 231, the processor 161 takes the RFID tag count 177 (FIG. 3), and compares it to a tag count threshold. More specifically, with reference to FIG. 6, the processor locates the current business value in column 216, and then selects a corresponding tag count threshold from column 218. In essence, as the number of products in the shopping cart increases (such that the number of RFID tags also increases), it becomes more difficult to accurately identify each and every tag with RFID technology. Stated differently, as the number of products and tags increases, there is a progressively increasing chance that the RFID identification process may have missed one or more of the products in a cart. In block 231, the processor compares the RFID tag count 177 to the tag count threshold obtained from column 218. If the tag count exceeds the threshold, then control proceeds to block 227 for an audit of the products in the cart. It will be noted from FIG. 6, that, as the business value progressively increases, representing a progressively increasing preference for accuracy at checkout, the tag count threshold in column 218 progressively decreases, meaning that progressively smaller product counts will trigger an audit.

In block 231, if the RFID tag count does not exceed the tag count threshold, then control proceeds to block 232. In block 232, the processor takes the measured cart weight 176 (FIG. 3), and subtracts the cart tare weight 182 in order to determine the measured product weight, or in other words the total weight of all contents of the cart. Note that this measured product weight will include not only products in the cart, but also anything else in the cart, such as a child 113 (FIG. 2) or personal effects such as a purse. However, to the extent that the image processing software 167 can identify a child and/or personal effects in the cart, it would optionally be possible to subtract a predetermined weight value from the measured product weight calculated in block 232, in order to at least partially compensate for the child and/or the personal effect.

From block 232, control proceeds to block 233, where the measured product weight calculated in block 232 is compared to a weight threshold. With reference to FIG. 6, the processor locates the current value of the business value in column 216, and then selects a corresponding weight threshold from column 219. If the measured product weight exceeds this weight threshold, then control proceeds from block 233 to block 227 for an audit of the contents of the cart. In essence, as the weight of products in the cart increases, either the total number of products is increasing, and/or the shopper is purchasing one or more heavier and potentially more valuable products, such as a television. It will be noted from FIG. 6 that, as the value of the business value in column 16 progressively increases, representing a progressively greater desire for an accurate product list at checkout, the weight threshold in column 219 progressively decreases, meaning that progressively fewer and/or lighter products will trigger an audit.

Figure 7:
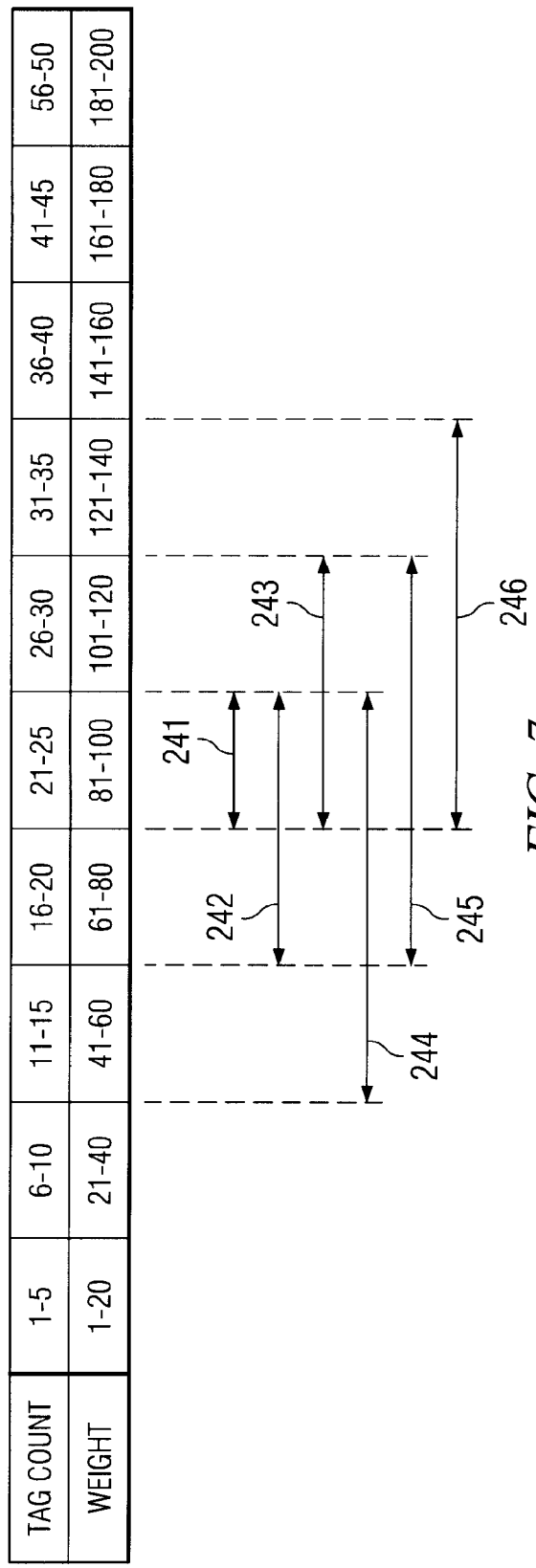

If it is determined in block 233 that the measured product weight does not exceed the weight threshold, then control proceeds from block 233 to block 236. In block 236, the processor takes the measured product weight determined in block 232, and checks to see whether this measured product weight and the RFID tag count 177 both fall within a specified window width. In this regard, with reference to FIG. 6, the processor locates the current value of the business value in column 216, and then selects a corresponding window width from column 220. FIG. 7 shows a table that is one of the tables stored at 197 (FIG. 3) in the memory 162, and that has 10 columns or "buckets" each relating a respective range of RFID tag counts to a respective weight range. The window width obtained from column 220 in FIG. 6 represents a number of adjacent columns in the table of FIG. 7. For example, if the window width is 1, then that represents one column in the table of FIG. 7, and the tag count and the measured weight should both be within the same column. Reference numeral 241 represents a window width of 1 column in FIG. 7. If the RFID tag count is in the range of 21 to 25, then the measured product weight should be in the range of 81 to 100 pounds. The window 241 is a sliding window, and could be associated with any single column in the table of FIG. 7, but the tag count and weight both need to be in that same column.

Alternatively, assume that the window width is 2 columns. Reference numerals 242 and 243 show two different possible positions of a sliding window having a width of two columns. Taking both of the window positions 242 and 243 into account, it will be noted that if the RFID tag count is in the range of 21 to 25, then the measured weight needs to be somewhere within the three columns spanned by the two window positions 242 and 243, or in other words in the range of 61 to 120 pounds. As still another example, reference numerals 244, 245 and 246 show three different positions of a sliding window having a width of 3 columns. Taking all three window positions 244, 245 and 246 into account, it will be noted that if the RFID tag count is in the range of 21 to 25, then the measured weight would need to be in the range of 41 to 140 pounds.

These are examples of how the processor 161 determines in block 236 (FIG. 5A) whether the measured product weight and the RFID tag count are both within the current window width. If they are not both within the window width, then control proceeds to block 227 for an audit of the contents of the cart. In essence, most shopping carts will exhibit a relatively close correlation between the number of tags read and the measured weight of the products. But if there is a differential that exceeds a specified tolerance (the current window width), then it raises a question as to whether the RFID product was accurate, and thus an audit is appropriate.

If it is determined in block 236 that the measured product weight and the RFID tag count are both within the appropriate window width, then control proceeds to block 251. In block 251, the processor takes the RFID product list 178, and looks up each listed product in the master product list 188, in order to determine the actual weight 194 (FIG. 4) of that particular product. The processor then adds up all of these weights in order to calculate the total weight of the products in the cart (as based on the information obtained using RFID technology). Then, the processor subtracts from the calculated product weight determined in block 251 the measured product weight determined in block 232 (which is based on the measurement made with scale 116). The processor takes the absolute value of the difference, in order to obtain a weight differential that is a positive number.

The measured product weight and the calculated product weight should usually be approximately the same. In other words, the calculated weight differential should usually be relatively small. The larger the weight differential, the greater the likelihood that the RFID product list may not include all of the products actually present in the cart, and thus the greater the justification for auditing the products in the cart. Accordingly, in block 252, the weight differential calculated in block 251 is compared to a differential threshold. In this regard, with reference to FIG. 6, the processor locates the current value of the business value 183 in column 216, and then selects a corresponding differential threshold from column 221. It will noted that, as the business value progressively increases, representing a progressively greater desire for accuracy in the product list used for checkout, the differential threshold in column 221 progressively decreases, such that progressively smaller weight differentials will trigger an audit of the contents of the cart. In block 252, if the calculated weight differential exceeds the differential threshold obtained from column 221, control proceeds to block 227 for an audit of the contents of the cart.

If it is determined in block 252 that the calculated weight differential does not exceed the specified differential threshold, then control proceeds to block 253. In block 253, the actual product count obtained by analyzing images from the cameral 118 is compared to the RFID product count obtained by interrogating RFID tags on products in the cart (or in other words the total number of products in the RFID product list 178 in FIG. 3). If these two product counts do not match exactly, then it suggests the RFID product list might not be entirely accurate, and so control proceeds to block 227 in order to carry out an audit of the contents of the cart. Otherwise, control proceeds from block 253 to block 254.

In block 254, the processor causes the display 69 in FIG. 1 to illuminate an arrow pointing to the left, indicating that the shopper in the interrogation zone 68 should proceed down the corridor 13 to the checkout area 17, where checkout and payment will be carried out using the RFID product list 178. Control then proceeds to block 228, for an exit from the routine of FIG. 5B.

Figure 8:
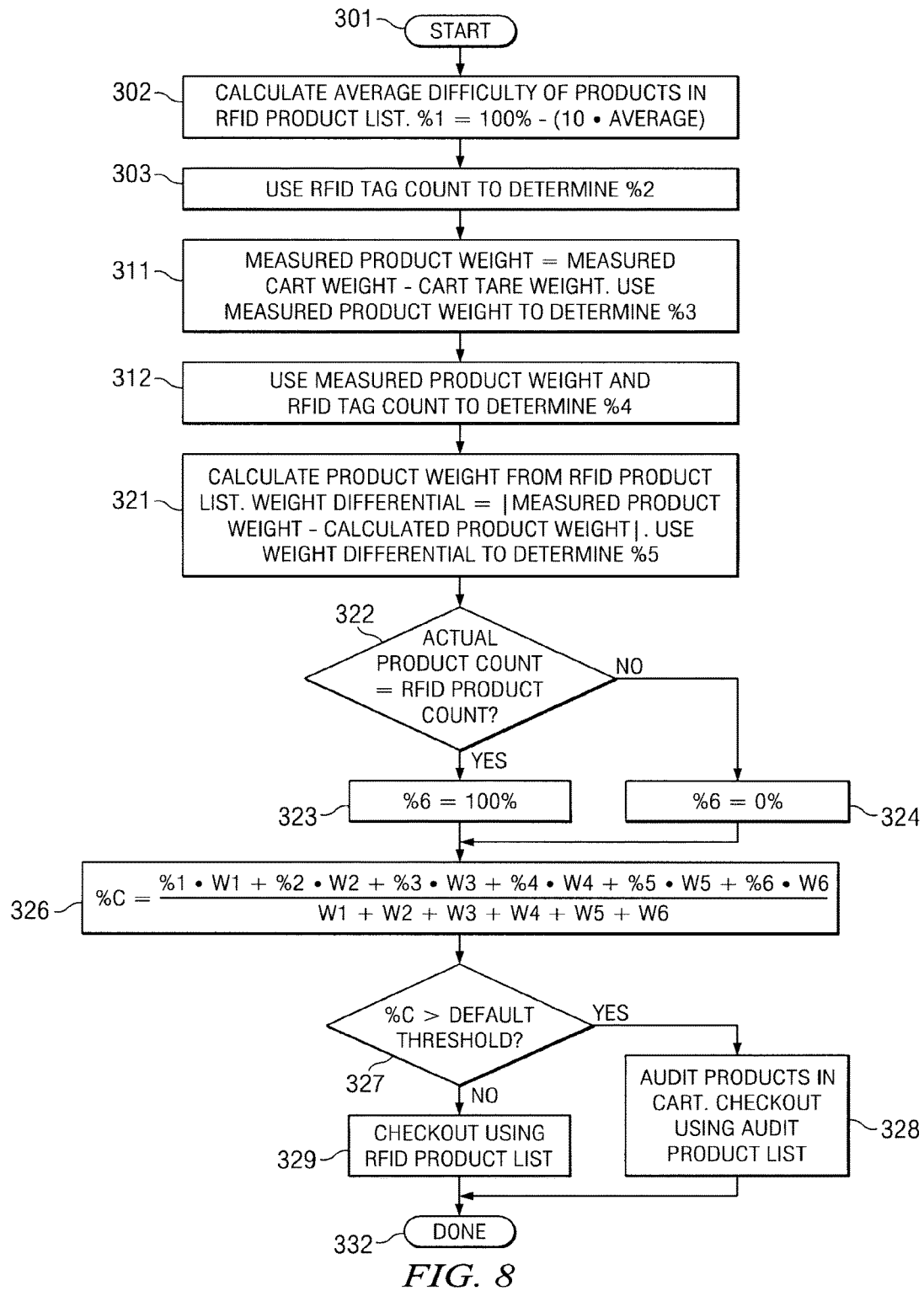
FIG. 8 is a flowchart showing a procedure that is an alternative embodiment of the procedure shown in FIGS. 5A and 5B.

FIG. 8 is a flowchart showing a procedure that is an alternative embodiment of the procedure shown in FIGS. 5A and 5B. In FIGS. 5A and 5B, the procedure is influenced by the current state of the business value 183 (FIG. 3), as explained in more detail above. In contrast, FIG. 8 takes a different approach that does not involve use of the business value 183. In particular, as discussed in more detail below, the procedure of FIG. 8 successively evaluates six different criteria that are similar to the six criteria used in the procedure of FIGS. 5A and 5B. The check of each criteria results in the determination of a respective confidence level for that criteria, where the confidence level is expressed as a percentage. The six confidence levels are then weighted, and combined to arrive at an overall confidence level. If the overall confidence level is above a threshold, then the cart is directed to checkout area 17, where checkout is carried out using the RFID product list 178. On the other hand, if the overall confidence level is below the threshold, then the cart is directed to checkout area 18, where an audit is performed, and checkout is carried out using the product list from the audit.

Turning now in more detail to FIG. 8, processing begins at 301, and proceeds to block 302. In block 302, the processor 161 takes the RFID product list 178 (FIG. 3), and looks each listed product up in the master product list 188 (FIGS. 3 and 4), in order to obtain the current difficulty rating 195 for that product. The processor then adds up all these difficulty ratings, and divides the sum by the number of products in the RFID product list, in order to obtain an average of the difficulty ratings for all products in the RFID product list 178. The average will necessarily be a number between 1 and 10. The processor multiplies this average by 10, in order obtain a percentage, and then subtracts this percentage from 100% in order to obtain a first percentage "%1".

Control then proceeds from block 302 to block 303. In block 303, the processor uses the RFID tag count 177 to determine a second percentage "%2". More specifically, FIG. 9 is a table that is one of the tables stored at 197 (FIG. 3) in the memory 162, and that has four columns 306, 307, 308 and 309. The left column 306 lists different possible values for the RFID tag count, and the right column 309 gives corresponding confidence levels, each expressed as a respective different percentage. The processor looks the RFID tag count 177 up in the left column 306, and then selects the associated percentage from column 309, for use as the second percentage "%2".

The processor then proceeds from block 303 to block 311. In block 311, the processor calculates a measured product weight in the same manner already discussed above in association with block 232 in FIG. 5A. The processor looks this measured product weight up in column 307 of the table in FIG. 9, and then selects the corresponding percentage from the right column 309 for use as a third percentage "%3".

The processor then proceeds from block 311 to block 312. In block 312, the processor determines a forth percentage "%4" based on the RFID tag count 177 (FIG. 3), and the measured product weight calculated in block 311. More specifically, with reference to FIG. 7, the processor identifies the column in FIG. 7 that corresponds to the RFID tag count 177, and also identifies the column that contains the measured product weight. If they are both in the same column, then the number of columns spanned is 1. If they are not in the same column but are in adjacent columns, then the number of columns spanned is 2. Similarly, if they are in different columns that have a single further column between them, then the number of column spanned is three. In this manner, the processor thus determines the number of columns in FIG. 3 that are spanned by the RFID tag count and the measured product weight.

FIG. 10 is a table that is one of the tables stored at 197 (FIG. 3) in the memory 162. The left column 316 contains possible values for the number of columns spanned in FIG. 7, and the right column 317 contains respective confidence levels, each expressed as a percentage. After determining the number of columns spanned in FIG. 7, the processor looks this number up in the left column 316 of the table in FIG. 10, and then selects the corresponding percentage from column 317 to serve as the fourth percentage "%4".

The processor then proceeds from block 312 to block 321. In block 321, the processor uses the RFID product list 178 and the master product list 188 (FIG. 3) to calculate a weight differential, in the same manner discussed above in association with block 251 of FIG. 5B. The processor looks this weight differential up in column 308 of the table in FIG. 9, and then selects the corresponding percentage from column 309 for use as a fifth percentage "%5".

The processor then proceeds to block 322, where it compares the actual product count 179 (FIG. 3) to the RFID product count, which is the number of products present in the RFID product list 178. This is equivalent to the comparison that was already discussed above in association with block 253 of FIG. 5B. If the actual product count is exactly the same as the RFID product count, then the processor proceeds to block 323, where it sets a sixth percentage "%6" to be 100%. Alternatively, if the actual product count and RFID product count are found to be different in block 322, then the processor proceeds to block 324, where it sets the sixth percentage "%6" to be 0%. From either of blocks 323 or 324, the processor proceeds to block 326.

As discussed above in association with FIG. 3, the memory 162 contains weighting values 184, and in particular six weighting values W1, W2, W3, W4, W5 and W6 that are each an integer between 1 and 5, inclusive. As shown in block 326, the processor calculates for the cart of interest an overall confidence level "% C", in particular by multiplying each of the percentages %1, %2, %3, %4, %5 and %6 by a respective weighting value W1, W2, W3, W4, W5 or W6, by then summing the products of these multiplications, and by then dividing the sum of the products by the sum of the weighting values.

The processor then proceeds to block 327, where it compares the calculated overall confidence level % C to the default threshold 186 (FIG. 3). As discussed earlier, the default threshold 186 is a percentage specified by store management, such as 65%. If the calculated confidence level % C is greater than the default threshold, then the processor proceeds from block 327 to block 238, where the cart of interest is sent for an audit, and then checkout is performed using the product list from the audit. In other words, in FIG. 1, the display 69 is used to direct the shopper in the interrogation zone 68 to proceed down the corridor 14 to the checkout area 18. In contrast, if it is determined in block 327 that the overall confidence level % C does not exceed the default threshold, then the processor proceeds from block 327 to block 239, where the cart of interest is sent to have checkout completed using the RFID product list 178 (FIG. 3). More specifically, with reference to FIG. 1, the display 69 is used to direct the shopper in the interrogation zone 68 to proceed down the corridor 13 to the checkout area 17. From either of blocks 328 and 329, the processor proceeds to block 332, for an exit from the routine of FIG. 8.

The embodiment that is shown in the drawings and described above is configured with a single interrogation zone 68, through which all shoppers must pass on their way to any of the checkout stations 31-36. Further, the checkout stations are organized into two groups, where checkout stations 31-33 in checkout area 17 are used for RFID checkout, and checkout stations 34-36 in checkout area 18 are used to audit carts. Alternatively, however, the central interrogation zone 68 could be eliminated, and a single group of checkout stations could be provided, where the checkout stations are all identical. A shopper could freely go to any of the checkout stations. Each checkout station would have its own dedicated interrogation zone. Each checkout station would be capable of checking out a shopper based on either the RFID product list or a cart audit, depending on the result of the interrogation performed in that checkout station's dedicated interrogation zone.

The embodiment shown in the drawings is capable of accommodating the presence in a shopping cart 66 of a child 133, or personal effects. Alternatively, however, in order to simplify the processing task carried out by the image processing software 167, it would be possible to require each shopper to remove any child and/or personal effects from a shopping cart before the cart enters the interrogation zone 68. Still another alternative would be to provide shopping carts that lack a child seat, in order to significantly reduce the likelihood that a child may be sitting in the cart when the cart reaches the interrogation zone.

For simplicity in disclosing the embodiment that is shown in the drawings, it has been assumed that all shopping carts in the store are identical, and thus have the same tare weight. However, some stores have two or more different types of shopping carts, such as traditional shopping carts and flatbed carts. Where there are two or more different types of carts, each type of cart will typically have a respective different tare weight. In that type of situation, each shopping cart would have an RFID tag mounted thereon. As a cart is passing through the interrogation zone 68 and the tags on products in the cart are being interrogated using RFID technology, the tag on that shopping cart would also be interrogated. Based on the information obtained from the cart's tag, the central computer system 152 would know the particular type of cart that is currently in the interrogation zone 68, and thus the appropriate tare weight to use in carrying out calculations relating to the weight of that cart.

Although a selected embodiment has been illustrated and described in detail, it should be understood that a variety of substitutions and alterations are possible without departing from the spirit and scope of the present invention, as defined by the claims that follow.

What is claimed is:

1. A method, comprising:
   providing a plurality of products that are each associated with a respective radio frequency identification tag;
   assigning a business value selected by a seller from a plurality of values, where each of the plurality of values represents a different threshold level of a current willingness of the seller to tolerate shrinkage ranging between a willingness to tolerate a minimum level of shrinkage, one or more intermediate levels of shrinkage and a maximum level of shrinkage,
   automatically selecting, by a computer system and based on the assigned business value, a value for each of a plurality of thresholds comprising a tag reading difficulty threshold, a tag count threshold, a product weight threshold, a product weight and tag count range threshold, and a product weight differential threshold,
      wherein each of the plurality of thresholds comprises multiple selectable values, the assigned business value defining the value for each threshold,
      wherein tag reading difficulty thresholds represent different levels of difficulty involved in identifying the product using the radio frequency identification technology; tag count thresholds represent a different number of the products identified using the radio frequency identification technology; product weight thresholds represent a different weight of the products identified using the radio frequency identification technology; product weight and tag count range thresholds represent different relationships between product weight and number of tags of the products identified using the radio frequency identification technology; and product weight differential thresholds represent different product weight differentials between a measured product weight and a calculated product weight of the products identified using the radio frequency identification technology;
   using a scale coupled to the computer system and located proximate to a point of sale (POS) checkout area to output a signal corresponding to a total weight including at least a container and a group of products collected by a shopper within the container as the shopper enters the POS checkout area;
   using one or more cameras coupled to the computer system and located proximate to the POS checkout area to output digital signaling corresponding to the container and the group of products collected by the shopper as the shopper enters the POS checkout area;
   using radio frequency identification technology obtained from at least one RFID tag reader coupled to the computer system and located proximate to the POS checkout area in real time as the shopper enters the POS checkout area to automatically identify specific products within the group of the products collected by the shopper; and
   determining, using the computer system and data obtained from each of the using steps and according to a set of rules, a value for each of a plurality of properties relating to the identified specific products collected by the shopper, wherein the plurality of properties comprises a tag reading difficulty, a tag count, a product weight, a product weight and tag count range, and a product weight differential;
   evaluating, using the computer system and according to the set of rules, whether to obtain payment from the shopper based on the radio frequency identification of products in the group and as a function of the business value assigned by the seller, and
   wherein the evaluating comprises applying, using the computer system and according to the set of rules, in real time the one or more of the plurality of thresholds having been automatically selected based on the assigned business value to one or more of the determined values of the plurality of properties of the identified products collected by the shopper, and
   based on the result of the evaluating, carrying out one of:
      obtaining payment from the shopper based on the radio frequency identification of products in the group; and
      auditing the products in the group, and then obtaining payment from the shopper based on the products identified by the auditing.

2. A method according to claim 1,
   including maintaining the business value in a memory of the computer system, wherein the assigned business value is selectively adjustable by the seller to a different one of the plurality of values.

3. The method of claim 2 further comprising:
   adjusting the assigned business value to a new business value selected by the seller, a new business value being a different one of the plurality of values.

4. The method of claim 3 wherein the adjusting the assigned business value can occur multiple times during a period of business operation hours.

5. A method according to claim 1,
   wherein the evaluating includes comparing the determined value of the tag count for the products identified with radio frequency identification technology to the number of products identified with the digital signaling from the one or more cameras; and
   carrying out the auditing and the obtaining of payment based on the auditing if the comparison indicates that the determined value of the tag count for the products identified with radio frequency identification technology is different from the number of products identified with the digital signaling from the one or more cameras.

6. The method of claim 1, wherein the business value has a numeric value selected by the seller, wherein an increasing numeric value of the business value corresponds to an increasing preference of the seller for accuracy at checkout.

7. The method of claim 1,
further comprising a first point-of-sale terminal at the POS checkout area,
wherein the auditing the products comprises auditing the products in the group at the first point-of-sale terminal by removing the products collected by the shopper from a product container and individually scanning the removed products to identify the specific products within the group of the products collected by the shopper, and then obtaining payment from the shopper at the first point-of-sale terminal based on the products identified by the auditing; and
wherein the obtaining the payment comprises obtaining payment from the shopper based on the radio frequency identification of products in the group not at the first point-of-sale terminal.

8. The method of claim 1,
wherein the determining the value comprises determining, at least in part using the signal, determined values for one or more of the product weight, the product weight and tag count range, and the product weight differential.

9. The method of claim 1, wherein the evaluating comprises determining whether the value of the tag reading difficulty property for any of the specific products identified using the radio frequency identification technology exceeds the selected value of the tag reading difficulty threshold.

10. The method of claim 1, wherein the evaluating comprises determining whether the value of the tag count property for the specific products identified using the radio frequency identification technology exceeds the selected value of the tag count threshold.

11. The method of claim 1, wherein the determining the value for the product weight property is based on the signal from the scale, and
wherein the evaluating comprises determining whether the value of the product weight property exceeds the selected value of the product weight threshold.

12. The method of claim 1, wherein the determining the value for the product weight property is based on the signal from the scale, and
wherein the evaluating comprises determining whether the value of the product weight property is within the selected value of the product weight and tag count range threshold of the value of the tag count property for the specific products identified using the radio frequency identification technology.

13. The method of claim 1, further comprising:
determining a calculated weight of the specific products identified using the radio frequency identification technology from a database of known product weights; and
determining a value for a product weight differential based on the calculated weight and the value of the product weight property, and
wherein the evaluating comprises determining whether the value of the product weight differential property exceeds the selected value of the product weight differential threshold.

14. A method, comprising:
providing a plurality of products that are each associated with a respective radio frequency identification tag;
using a scale coupled to a computer system and located proximate to a point of sale (POS) checkout area to output a signal corresponding to a total weight including at least a container and a group of products collected by a shopper within the container as the shopper enters the POS checkout area;
using one or more cameras coupled to the computer system and located proximate to the POS checkout area to output digital signaling corresponding to the container and the group of products collected by the shopper as the shopper enters the POS checkout area;
using radio frequency identification technology obtained from at least one RFID tag reader located proximate to the POS checkout area in real time as the shopper enters the POS checkout area to automatically identify specific products within the group of the products collected by the shopper; and
evaluating, using the computer system and according to a set of rules, whether to obtain payment from the shopper based on the radio frequency identification of products in the group and then, based on the result of the evaluating, carrying out one of:
obtaining payment from the shopper based on the radio frequency identification of products in the group; and
auditing the products in the group, and then obtaining payment from the shopper based on the products identified by the auditing;
wherein the evaluating according to the set of rules includes:
determining, using the computer system, the signal from the scale, the digital signaling from the one or more cameras, and the specific products identified using the radio frequency identification technology, and according to the set of rules, a value for each of a plurality of properties relating to the identified specific products collected by the shopper, wherein the plurality of properties comprises a tag reading difficulty, a tag count, a product weight, a product weight and tag count range, a product weight differential and a product count differential,
determining, for each of a plurality of different criteria that are each a function of the group of products collected by the shopper and the determined values for each of the plurality of properties, a confidence level having a value from a set of confidence levels corresponding to each criteria, resulting in a plurality of determined confidence levels specific to the products identified using radio frequency identification technology,
wherein the plurality of different criteria comprises a tag reading difficulty criteria, a tag count criteria, a product weight criteria, a product weight and tag count range criteria, a product weight differential criteria, and a count differential criteria, wherein each of a plurality of different criteria corresponds to a condition that suggests a likelihood that the radio frequency identification of products in the group may not be fully accurate,
wherein the tag reading difficulty criteria corresponds to a level of difficulty involved in identifying the product using the radio frequency identification technology; the tag count criteria corresponds to a number of the products identified using the radio frequency identification technology; the product weight criteria corresponds to a weight of the products based on the signal from the scale; the product weight and tag count range criteria corresponds to a relationship between the weight of the products based on the signal from the scale and number of tags of the products identified using the radio frequency identification technology; the product weight differential criteria corresponds to a weight differential between a measured product weight using the signal from the scale and a calculated product weight of the products identified using the radio frequency identification technology; and the count differential criteria corresponds to a difference between the number of items identified using the radio frequency identification technology and a number of items identified using the one or more cameras, wherein each of plurality of determined confidence levels comprise a tag reading difficulty confidence level, a tag count confidence level, a product weight confidence level, a product weight and tag count range confidence level, a product weight differential confidence level, and a count differential confidence level;

wherein the tag reading difficulty confidence level is associated with a level of difficulty involved in identifying the product using the radio frequency identification technology; the tag count confidence level is associated with a number of the products identified using the radio frequency identification technology; the product weight confidence level is associated with a weight of the products based on the signal from the scale; the product weight and tag count range confidence level is associated with a relationship between the weight of the products based on the signal from the scale and number of tags of the products identified using the radio frequency identification technology; the product weight differential confidence level is associated with a weight differential between a measured product weight and a calculated product weight of the products identified using the radio frequency identification technology; and the count differential confidence level is associated with a difference between the number of items identified using the radio frequency identification technology and a number of items identified using the one or more cameras:

determining an overall confidence value based on a weighting of the plurality of determined confidence levels; and determining the result of the evaluating as a function of the overall confidence value relative to a default threshold defined by the seller and selected by the seller from a plurality of default thresholds.

15. A method according to claim 14,
including using a further technology different from radio frequency identification technology to automatically identify the specific products within the group of the products collected by the shopper; and wherein the determining of confidence levels includes determining one of the confidence levels by assigning it a high level of confidence if the number of products identified with radio frequency identification technology equals the number of products identified with the further technology, and assigning it a low level of confidence if the number of products identified with radio frequency identification technology is different from the number of products identified with the further technology.

16. The method of claim 14, wherein the value of each of the plurality of confidence levels comprises a percentage.

17. The method of claim 14,
wherein the determining the value comprises determining, at least in part using the signal, determined values for one or more of the product weight, the product weight and tag count range, and the product weight differential.

18. The method of claim 14 wherein the determining the overall confidence value based on the weighting of the plurality of determined confidence levels comprises:
multiplying each of the plurality of determined confidence levels by a respective weighting factor to provide a plurality of weighted determined confidence levels;
summing each of the plurality of weighted determined confidence levels to provide a summed value; and
dividing the summed value by a summed total of the plurality of determined confidence levels.

19. A system, comprising:
an interrogation zone located proximate to a point of sale (POS) checkout area comprising:
a weight measuring section comprising a scale configured to output a signal corresponding to a total weight including at least a container and a group of products collected by a shopper within the container as the shopper enters the POS checkout area;
one or more cameras configured to output digital signaling corresponding to the container and the group of products collected by the shopper as the shopper enters the POS checkout area;
a radio frequency identification (RFID) section that uses radio frequency identification technology comprising at least one RFID tag reader configured to automatically identify specific products within the group of products collected by the shopper in real time as a shopper enters the POS checkout area, wherein each of the identified specific products is associated with a respective radio frequency identification tag; and
an evaluating section including a computer system coupled to the scale, the one or more cameras and the RFID tag reader and is configured to obtain a business value assigned by a seller from a plurality of values, where each of the plurality of values represents a different threshold level of a current willingness of the seller to tolerate shrinkage ranging between a willingness to tolerate a minimum level of shrinkage, one or more intermediate levels of shrinkage and a maximum level of shrinkage,
wherein the computer system is configured to automatically select, based on the assigned business value, a value for each of a plurality of thresholds comprising a tag reading difficulty threshold, a tag count threshold, a product weight threshold, a product weight and tag count range threshold, and a product weight differential threshold,
wherein each of the plurality of thresholds comprises multiple selectable values, the assigned business value defining the value for each threshold,
wherein tag reading difficulty thresholds represent different levels of difficulty involved in identifying the product using the radio frequency identification technology; tag count thresholds represent a different number of the products identified using the radio frequency identification technology; product weight thresholds represent a different weight of the products identified using the radio frequency identification technology; product weight and tag count range thresholds represent different relationships between product weight and number of tags of the products identified using the radio frequency identification technology; and product weight differential thresholds represent different product weight differentials between a measured product weight and a calculated product weight of the products identified using the radio frequency identification technology;

wherein the computer system is configured to determine, using the signal from the scale, the digital signaling from the one or more cameras, and the specific products identified using the radio frequency identification technology, and according to a set of rules, a value for each of a plurality of properties relating to the identified specific products collected by the shopper, wherein the plurality of properties comprises a tag reading difficulty, a tag count, a product weight, a product weight and tag count range, and a product weight differential;

wherein the computer system is further configured to evaluate according to a set of rules whether to obtain payment from the shopper based on the radio frequency identification of products in the group and as a function of the business value assigned by the seller; and wherein the computer system is further configured to evaluate by applying, according to the set of rules, in real time the one or more of the plurality of thresholds having been automatically selected based on the assigned business value to one or more of the determined values of the plurality of properties of the identified specific products collected by the shopper, and then, based on the result of the evaluation, the computer system calls for one of:

obtaining payment from the shopper based on the radio frequency identification of products in the group; and auditing of the products in the group, followed by obtaining payment from the shopper based on the products identified by the auditing.

20. The system according to claim 19,
wherein the group of products collected by the shopper is in a shopping container;
wherein the scale measures the weight of the container and the products therein; and
wherein the computer system subtracts the tare weight of the container from the measured weight of the container and products therein in order to obtain the value for the product weight of the products.

21. The system according to claim 19, including first and second point-of-sale terminals that are each operatively coupled to the computer system the first point-of-sale terminal being used for the obtaining of payment from the shopper based on the radio frequency identification of products in the group, and the second point-of-sale terminal being used for the auditing of the products in the group, and the obtaining payment from the shopper based on the products identified by the auditing.

22. The system of claim 19, wherein the computer system is configured to determine whether the value of the tag reading difficulty property for any of the specific products identified using the radio frequency identification technology exceeds the selected value of the tag reading difficulty threshold.

23. The system of claim 19, wherein the computer system is configured to determine whether the value of the tag count property for the specific products identified using the radio frequency identification technology exceeds the selected value of the tag count threshold.

24. The system of claim 19, wherein the computer system is configured to determine whether the value of the product weight property exceeds the selected value of the product weight threshold.

25. The system of claim 19, wherein the computer system is configured to determine whether the value of the product weight property is within the selected value of the product weight and tag count range threshold of the value of the tag count property for the specific products identified using the radio frequency identification technology.

26. The system of claim 19, the computer system is further configured to: determine a calculated weight of the specific products identified using the radio frequency identification technology from a database of known product weights; and determine a value for a product weight differential based on the calculated weight and the value of the product weight property, and determine whether the value of the product weight differential property exceeds the selected value of the product weight differential threshold.

27. The system of claim 19 wherein the computer system is configured to: maintain the assigned business value in a memory of the computer system, wherein the assigned business value is selectively adjustable by the seller to a different one of the plurality of values; obtain an adjusted business value assigned by the seller from the plurality of values; and adjust the assigned business value to a new business value selected by the seller, a new business value being a different one of the plurality of values.

28. The system of claim 27 wherein the computer system is configured to obtain adjusted business values multiple times during a period of business operation hours.

* * * * *